United States Patent
Flood

[19]

[11] Patent Number: 5,737,801
[45] Date of Patent: Apr. 14, 1998

[54] CHANNEL MEMBERS

[76] Inventor: William R. Flood, 1404 Henry Ave., Des Plaines, Ill. 60016

[21] Appl. No.: 746,331

[22] Filed: Nov. 12, 1996

[51] Int. Cl.$^6$ .................................................. B60B 33/00
[52] U.S. Cl. ........................... 16/30; 248/223.41; 403/22
[58] Field of Search ........................... 16/30, 29, 19, 16/31 R, 31 A, 32, 33; 248/188.1, 188, 223.41, 223.61, 223.51; 403/22, 375, 331

[56] References Cited

U.S. PATENT DOCUMENTS

| | | | |
|---|---|---|---|
| 1,706,945 | 3/1929 | White | 189/37 |
| 1,796,994 | 3/1931 | Husted | 248/323 |
| 1,879,295 | 9/1932 | Kahn | 189/37 |
| 1,912,795 | 6/1933 | Rice et al. | 16/43 |
| 1,951,810 | 3/1934 | Schaffert | 189/37 |
| 1,953,636 | 4/1934 | Skelton | 16/30 |
| 1,982,868 | 12/1934 | Herold | 16/29 |
| 2,167,836 | 8/1939 | Greulich | 189/40 |
| 2,387,432 | 10/1945 | Du Laney | 189/40 |
| 2,664,294 | 12/1953 | Kleinman | 248/223.41 |
| 2,928,512 | 3/1960 | Slater et al. | 403/22 |
| 3,487,495 | 1/1970 | Schultz, Jr. | 16/30 |
| 4,856,250 | 8/1989 | Gronau et al. | 52/480 |
| 5,351,926 | 10/1994 | Moses | 248/354.5 |
| 5,428,866 | 7/1995 | Aschow | 16/30 |
| 5,457,849 | 10/1995 | Branson et al. | 16/30 |

Primary Examiner—Chuck Mah
Attorney, Agent, or Firm—James A. Geppert

[57] ABSTRACT

An insert adapted to be positioned within an elongated channel member having a base portion and a pair of parallel sides, with the sides terminating in internally curled edges defining an open side forming a C-shaped channel, the insert having a width to be conformably received in said channel member either for longitudinal movement therein or to be positioned therein to receive the shank or axle of a caster or wheel, respectively. The insert may be either square in cross section and generally rectangular in shape or generally cylindrical with a pair of oppositely disposed grooves formed in the side surfaces of the insert to receive the curled edges of the channel member. The insert also may be provided with a body portion having a pair of oppositely disposed flanges extending from the body to form a generally rectangular outline, the insert being received in the channel member in a longitudinal manner. Each flange has an internally threaded opening therein to receive a bolt to either secure the insert in the member or to wedge the insert against the curled edges by the projecting ends of said bolts extending through the flanges to engage the channel member, and a central opening is provided to receive the shank of a caster or wheel axle. Also, the insert may be connected with an appropriate mechanical means to provide longitudinal movement within the channel member.

18 Claims, 3 Drawing Sheets

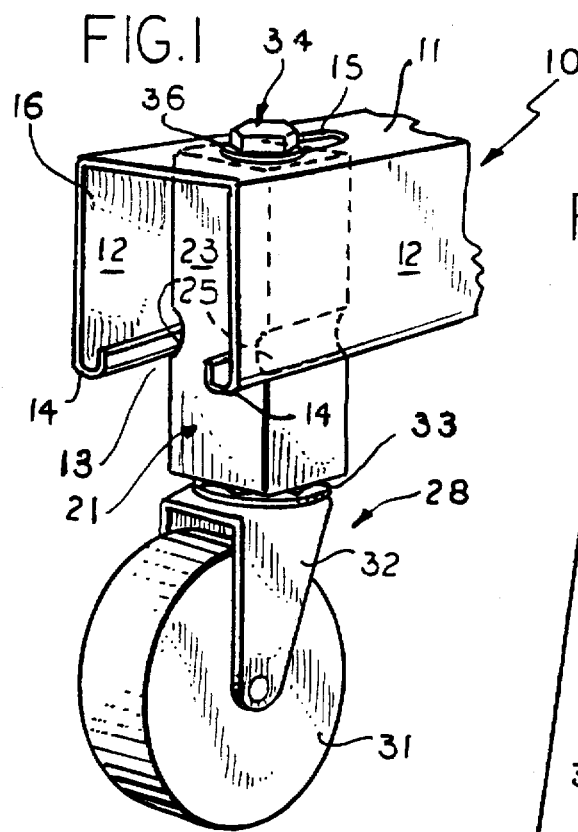
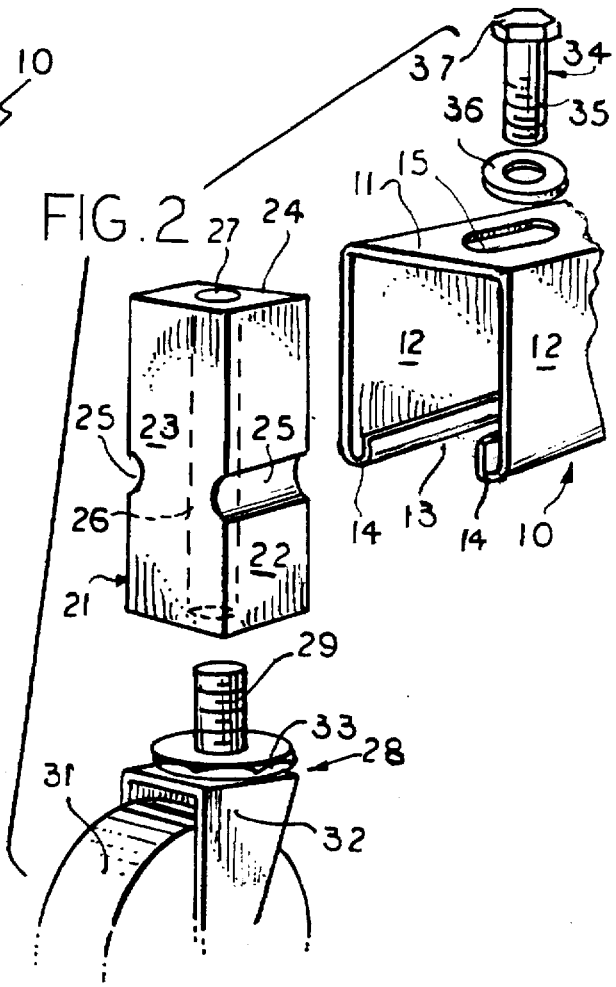
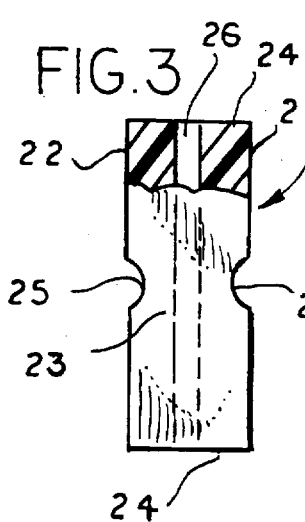
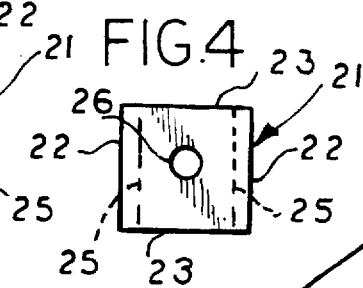
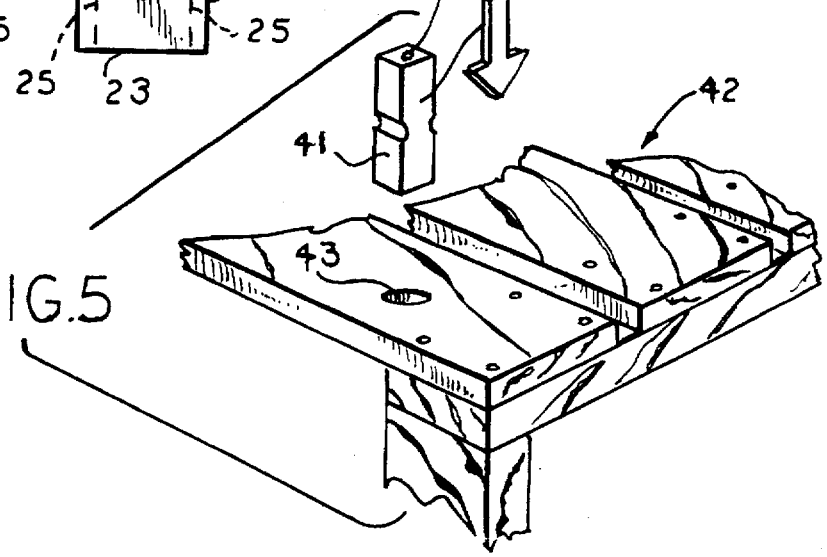

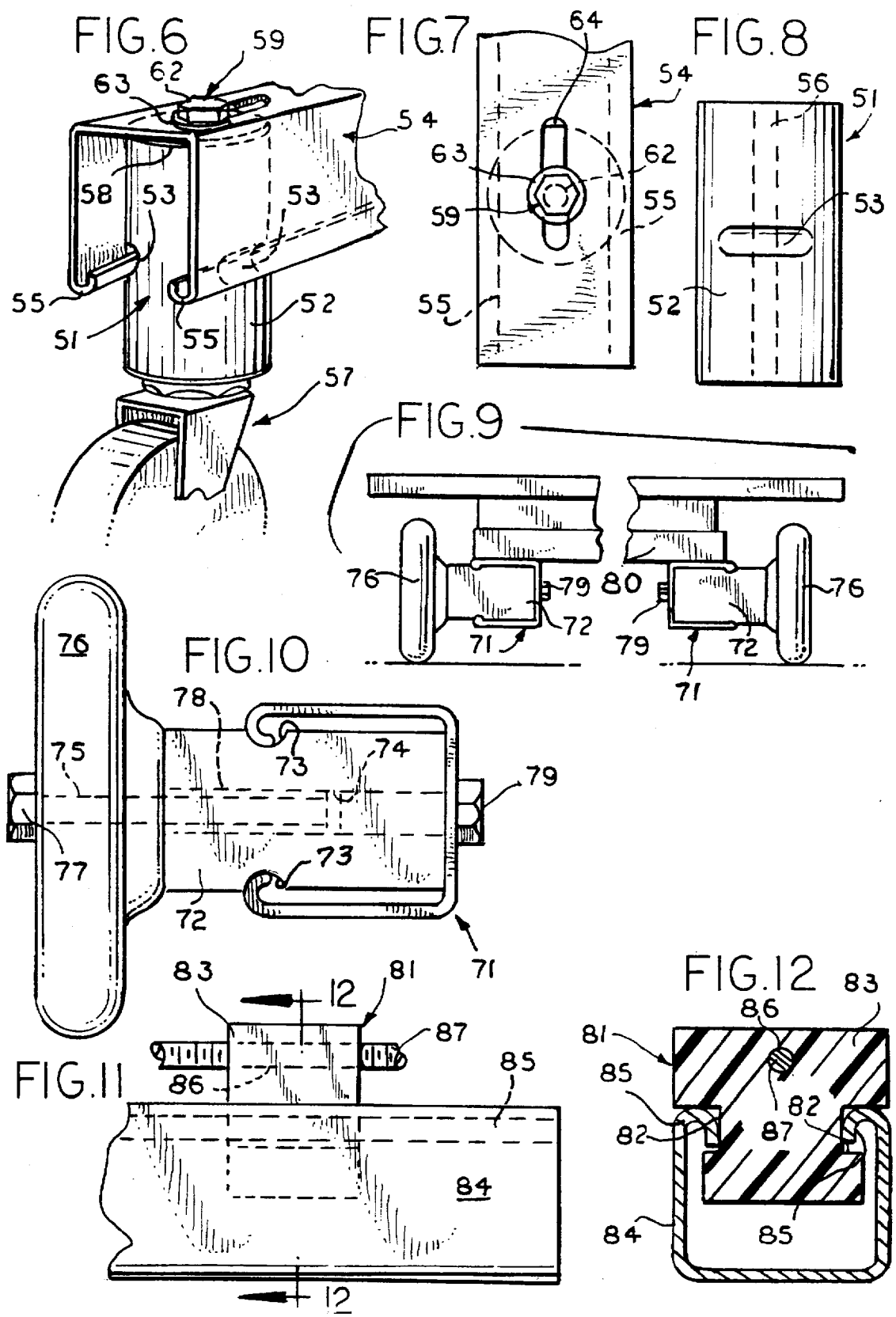

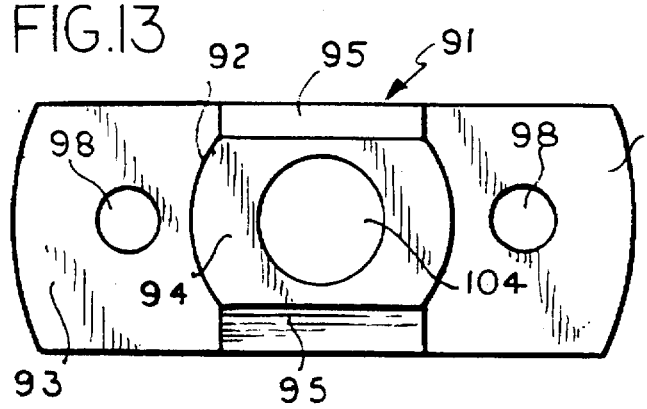
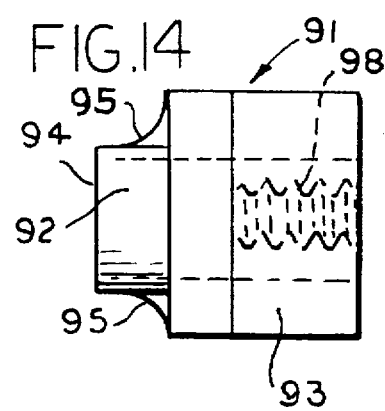
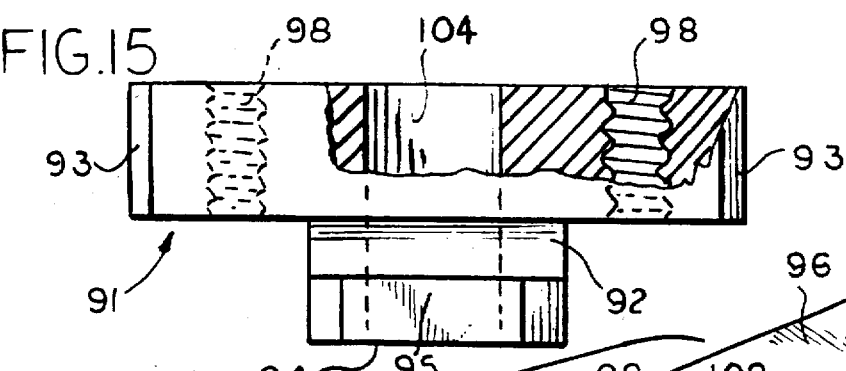
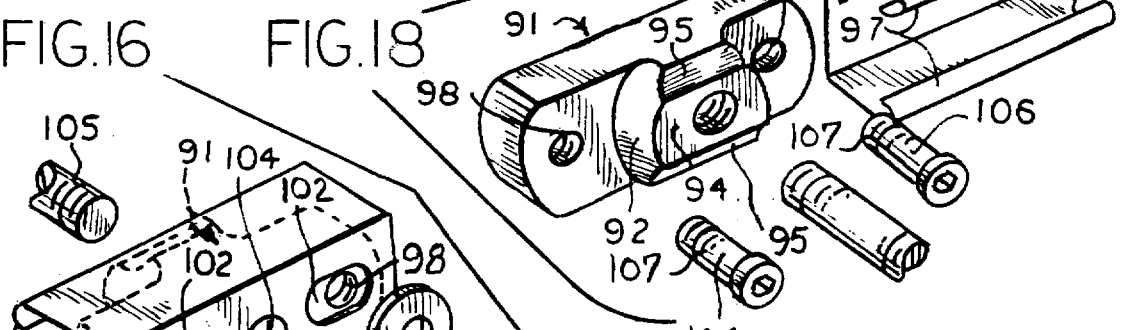
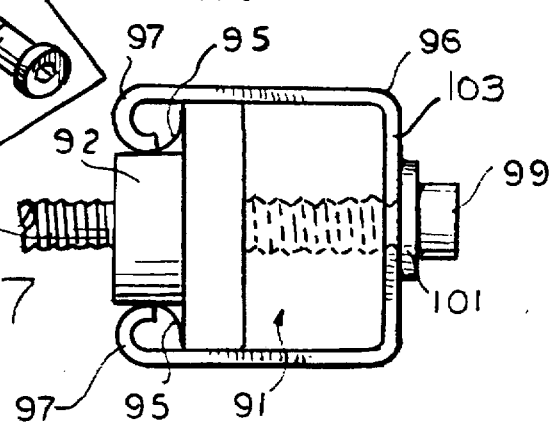

5,737,801

CHANNEL MEMBERS

TECHNICAL FIELD

The invention disclosed herein relates to inserts adapted to be secured within or movable within a U-shaped channel member and/or the use of such an insert positioned within the channel member for reception of a caster or wheel member.

BACKGROUND

The present invention relates to a commercially available channel-shaped member which is identified under the designation "Unistrut" and is utilized for the formation of metal framework and/or framing systems. The "Unistrut" system provides a grid-like arrangement with the assembly of basic shapes of C-shaped channel members open at their ends and having rolled or curled inner edges defining an open side of the channel. The base or closed-side of the channel member can be provided with appropriately located openings or slots to receive bolts cooperating with nuts and bridging members to secure the channel members together in extended lengths by bolting the bridging members within and projecting from the ends of the channel members.

The channel members may be used alone, or in back-to-back arrangements or in combinations or arrangements where the members are side-to-side, back-to-back combined with side-to-side, and/or in overlapping arrangements. When used with fittings, such as flat plate fittings, ninety-degree angle fittings, angular fittings, Z-shaped fittings, U-shaped fittings and wing shape fittings, the channel members can be bolted together in a variety of combinations to form frameworks and grids for construction projects; however, the channel members are limited in their versatility. Thus, the framework cannot be used to provide a mechanical movement along a channel member as in a crane or hoist for lifting objects or transporting objects from one end of the gridwork to the other. Also, the framework cannot be easily moved or transported, as in a conveyor or caster arrangement. The present invention provides answers to these shortcomings by providing various embodiments of inserts for use in combination with the channel members to provide a suitable mounting for a caster or wheeled arrangement for the framework or to provide for a mechanical movement relative to the framework.

SUMMARY OF THE INVENTION

The present invention relates to a variety of inserts utilized in channel members, such as a "Unistrut" member, wherein the application of one or more inserts into the channel members provides a non-rotatable member for reception of the shank of a caster to provide mobility of the members in a suitable framework. The channel members are of an elongated C-shape having a base portion, parallel sides, and an open side with the edges of the parallel sides provided with curled or rounded surfaces to provide inwardly extending rounded flange-like edges defining the open side of the member. An insert in either polygonal cross section or cylindrical form has opposed notches or grooves formed in insert surfaces to receive the curled flange-like edges and cooperate therewith to prevent rotation of the insert. The insert further has a central or axial opening therethrough which is adapted to receive a suitable shank within the central opening of the insert and be secured therein. The opposite end of the opening may be threaded to receive the threaded shank of a bolt extending through an opening in the base of the channel member to secure a caster and insert in an operative position in the channel member.

The present invention also comprehends the use of an insert in a channel member where the insert is provided with an axial opening therethrough to receive a bolt or other axle for a wheel of a larger dimension, where the channel member is positioned on its side so as to orient the wheel with its ground engaging surface parallel with the axis of the insert. In this arrangement, pairs of channel members can be arranged with wheels on the outer dimensions to provide a conveyor formed of channel members which are pivotally joined in longitudinal fashion and connected through cross braces.

The present invention further comprehends a novel mechanical movement arrangement for the channel members in a framework to provide either horizontal or vertical direction of movement for transporting members or lifting or carrying loads from one point to another. The insert is also provided with opposed grooves receiving the flange-like edges of the channel members and has a suitable opening or other connection cooperating with motive power in a straight-line direction via a screw feed, lever actuation, or similar manner.

DESCRIPTION OF THE DRAWINGS

FIG. 1 is a perspective view of the insert of the present invention secured within a channel-shaped member for use with a caster FIG. 2 is an exploded perspective view of the insert, caster and channel member of FIG. 1.

FIG. 3 is a front view, partially broken away, of the insert of FIGS. 1 and 2

FIG. 4 is a top plan view of the insert of FIG. 3.

FIG. 5 is an exploded view of an insert acting in cooperation with an opening in a pallet.

FIG. 6 is a perspective view of a second embodiment of insert positioned within a channel member for application with a caster.

FIG. 7 is a top plan view of the channel member and insert of FIG. 6.

FIG. 8 is a side elevational view of the insert.

FIG. 9 is a front elevational view of a third embodiment of insert utilized with a large ground engaging wheel for use in a conveyor.

FIG. 10 is a front elevational view of the wheel arrangement of FIG. 9.

FIG. 11 is a side elevational view of a fourth embodiment of insert utilized in a mechanical movement in cooperation with a channel member.

FIG. 12 is a vertical cross sectional view of the mechanical movement insert taken on line 12—12 of FIG. 11.

FIG. 13 is a top plan view of a fifth embodiment of insert.

FIG. 14 is an end elevational view of the insert of FIG. 13.

FIG. 15 is a side elevational view, partially broken away, of the insert.

FIG. 16 is an exploded perspective view of one method of securing the insert within the channel member.

FIG. 17 is an end elevational view of the insert assembled in the channel member.

FIG. 18 is an exploded perspective view of a second method of securing the insert in a channel member.

BEST MODES OF CARRYING OUT THE INVENTION

Referring more particularly to the disclosure in the drawings wherein are shown illustrative embodiments of the present invention, with FIG. 1 showing an insert of this invention designed for use with a steel beam or member used in a space framework where the channel member is noted as "UNISTRUT", a trademark of the UNISTRUT corporation or known as "B-LINE" a trademark of the B-Line Systems, Inc. The channel member 10 is formed having a C-shape in cross section with the member consisting of a base or back member 11, generally parallel sides 12, 12 and an open side 13 defined by inwardly curled edges 14, 14. The member 10 is of an indeterminate length open at each end 16 and may have openings or slots 15 formed in either the base 11 or one or both sides 12, 12. As shown in FIG. 1, a rectangular insert or block 21 having pairs of sides 22, 22 and 23, 23 and opposite ends 24, 24 is of such a width that it will conformably fit within the open side 13 of the channel member to allow the member to be received therein, opposite sides 22, 22 of the block have opposed concave grooves 25, 25 of a dimension to receive the curled edges 14, 14 of the channel member and allow longitudinal movement of the insert 21 within the member 10.

Also, as seen in FIGS. 1 through 4, a central axial hole 26 extends through the insert and is internally threaded at 27 to receive the threaded shank 29 of a caster assembly 28. The caster assembly includes the shank 29, a caster wheel 31, a U-shaped bracket 32 and a suitable ball-bearing mounting or swivel 33 between the bracket and shank to allow relative rotation therebetween. The insert 21 is formed of a suitable plastic material, such as nylon, teflon, etc., so that it is capable of sliding within the channel member, and, may be secured in the member 10 by the threaded shank 35 of a bolt 34 extending through the opening 15; the bolt having a suitable washer 36 thereon to space the enlarged bolt head 37 from the channel member. Thus, it can be seen that the insert can be easily moved into and installed in the channel member by one worker with a single tool for rotation of the bolt.

The shank of the caster may also be cylindrical or of a polygonal shape (not shown) rather than the externally threaded shank wherein the shank is of such a dimension that it will be a force or friction fit within the opening or passage 26 in the insert to prevent rotation of the caster shank.

In FIG. 5, a rectangular or other polygonal insert 41 is shown adapted for a force or friction fit in an opening 43 in a pallet or skid 42, which pallet may be formed of either wood or plastic material; the opening 44 in the insert being adapted to receive the shank of a caster such as shown in FIGS. 1 or 2 to improve the mobility of a loaded pallet in a factory or other environment where pallets are utilized and moved from place to place. The caster shank may also be of other suitable cross sections, such as hexagonal or cylindrical.

With reference to FIGS. 6, 7 and 8, a second embodiment of insert 51 is shown in a mounting similar to FIG. 1 except that the insert is cylindrical with a straight side wall 52 having a pair of opposed concave grooves 53 therein to receive the curled inner edges 55 of a channel member 54. Again, the insert is provided with a central passage or opening 56 therethrough to receive the threaded shank of a caster 57 and on the opposite end 58, the threaded shank of a bolt 59 having an enlarged head 62 and provided with a washer 63; the bolt extending through an opening or slot 64 in the base of the channel member.

FIGS. 9 and 10 disclose a third arrangement of an insert 72 and channel member 71 where the member is positioned on its side to provide a C-shaped channel member receiving the insert 72 with opposite concave grooves 73 thereon and having a central passage 74 therethrough. An enlarged wheel 76 on an axle 75 having an enlarged head 77 is positioned at the open side of the channel member 71 with the axle 75 received in an appropriate wheel bearing 78, which bearing is located in the passage in the insert and secured therein in a suitable manner. A suitable bolt 79 extends through an opening in the base surface of the channel member 71 to secure the insert 72 in operative position therein. Utilizing pairs of parallel channel members 71, 71 with the wheels 76 mounted thereon and cross members 80 connecting the channel members 71, the assembly converts to an elongated conveyor system for the conveyance of goods from one place to another.

FIGS. 11 and 12 disclose a fourth embodiment of insert 81 which, as seen in FIG. 12, has a generally T-shape with opposed grooves 82 formed below the T-head 83 of the insert. Here again, the insert is received within a channel member 84 with the grooves 82 receiving the inturned curled edges 85 of the channel member, and the insert includes a central passage 86, which may be threaded to receive an elongated externally threaded screw 87. Upon rotation of the screw 87, the insert 81 is subject to axial or longitudinal movement along and within the channel member 84 which may be used in a variety of ways. If the channel member is a vertical member, action of the screw would produce a vertical lifting movement of the insert and anything attached thereto. In a horizontal orientation of the channel member, rotation of the screw provides longitudinal movement of the insert and a pulley suspended from the insert. Obviously, the use of the movement of the insert can be used in other ways and directions. Also, the motive force providing movement of the insert is not limited to a screw action, but a lever or toggle action or piston and cylinder attached to the insert would also produce a desired movement.

FIGS. 13 through 18 illustrate another form of insert 91 having a central body 92 with oppositely extending flanges 93, 93 to provide a generally rectangular shape. The body portion 92 terminates at its upper end 94 in oppositely disposed curved surfaces 95, 95 forming a necked down upper end; the necked down portion receiving the oppositely curved edges 97, 97 of the channel member 96 as shown in FIGS. 16 and 17. The insert 91 can be secured within the channel member by one of two methods. In the first method shown in FIGS. 16 and 17, each flange 93 is provided with an internally threaded opening 98 within the flange to receive a bolt 99 which projects through an opening 102 formed in the base 103 of the channel member; the bolt 99 carrying a washer 101 thereon. A central internally threaded opening 104 in the body portion is adapted to threadingly receive a threaded shank 105 of a caster assembly like that shown in FIG. 1 for assembly of a caster onto the channel member or of a wheel assembly such as shown in FIGS. 9 and 10.

In the second method, bolts 106 having threaded shanks 107 threadedly engage the internally threaded openings 98 in the flanges 93 and project through the openings to engage the interior surface 108 in the base portion 103 of the channel member 96 and effectively urge the curved surfaces 95 against the flanges 97 and thus to frictionally secure the insert in the channel member. Likewise, the threaded shank of a caster is received in the internally threaded opening of the body portion. This further embodiment of insert shown in these figures of the drawings utilizes a conventional caster so that the channel member can become a part of a structural unit which can be manipulated or moved from place to place in a plant or other manufacturing facility. Also, as clearly understood, the insert can be positioned in a channel member and easily secured by one workman with a single tool.

I claim:

1. In combination with an elongated channel member having a generally C-shape in cross section and provided with a base portion and a pair of generally parallel sides terminating in inwardly curled edges defining an elongated open side, an insert adapted to be positioned within the channel member, said insert including an elongated body having a portion projecting outwardly of the channel member and of a width to be conformably received within the channel member, said insert having a pair of oppositely disposed parallel grooves receiving the curled edges of said channel member to allow longitudinal movement of the insert within the member, said insert having at least one opening extending therethrough, said opening being internally threaded to receive a bolt securing the insert within the channel member, and said channel member being provided with an opening receiving said bolt.

2. An insert as set forth in claim 1, including a caster member having a shank wherein said insert opening receives the shank of said caster member for mounting therein.

3. An insert as set forth in claim 2, in which said channel member opening is formed in the base portion and is generally aligned with the opening in said insert for said bolt to project therethrough.

4. An insert as set forth in claim 2, in which said caster is provided with a threaded shank and said insert opening is internally threaded to receive the threaded shank therein.

5. An insert as set forth in claim 2, in which said caster is provided with a shank adapted to provide a friction fit within the opening in the insert.

6. An insert as set forth in claim 1, in which said insert is of a rectangular shape with a generally square cross section adapted to conformably fit within the channel member with said insert opening extending longitudinally therethrough.

7. An insert as set forth in claim 1, in which said insert has a generally cylindrical shape of a diameter to be received within said insert channel member, and said opening extends axially through the cylinder.

8. An insert as set forth in claim 7, wherein said pair of oppositely disposed grooves are formed in the cylindrical surface thereof.

9. An insert as set forth in claim 1, wherein said insert is located within a channel member having the open side facing downwardly.

10. An insert as set forth in claim 1, wherein said channel member has its open side facing sideways with the insert received therein and adapted to receive a horizontally positioned bearing for a shank or axle of an enlarged wheel.

11. An insert as set forth in claim 10, in which said insert may be of a generally rectangular shape with said insert opening forming a horizontally oriented passage therethrough to receive said bearing and axle, said passage also having internal threads for a bolt extending through a suitable opening in the base portion of said channel member.

12. In combination with a channel member having a generally C-shape in cross section and provided with a base portion and generally parallel side walls terminating in oppositely inwardly curled edges defining an elongated open side, an insert having a central body portion with a pair of oppositely extending flanges formed thereon, said body portion and flanges forming a generally rectangular member adapted to be received longitudinally with said channel member, said body portion having a centrally located opening extending therethrough, said central body portion projecting outwardly of the channel member and said flanges conformably received within said channel member.

13. An insert as set forth in claim 12, wherein each flange includes an internally threaded opening extending therethrough.

14. An insert as set forth in claim 13, wherein a bolt is inserted into each flange opening and extends therethrough to engage the base portion of said channel member and urge said insert against said inwardly curled edges within said channel member.

15. An insert as set forth in claim 13, wherein said channel member includes openings generally aligned with said flange openings and adapted to receive bolts to be threaded into said insert flanges.

16. In combination with a channel member having a generally C-shape in cross section and provided with a base portion and a pair of generally parallel sides terminating in oppositely inwardly curled edges defining an elongated open side, an insert including an elongated body of a width to be conformably received within said channel member and having a portion projecting outwardly of the channel member through said open side, said insert having a pair of oppositely disposed parallel grooves receiving the curled edges of said channel member to allow longitudinal movement of the insert within the member, said insert being slidably received within said channel member for movement longitudinally therein, and means to drive said insert within said channel member from one location to another.

17. An insert as set forth in claim 16, wherein said insert portion projecting beyond the curled edges of said channel member includes an opening paralleling the axis of said channel member and internally threaded therethrough, and said drive means comprises a threaded shaft engaging said insert through said threaded opening.

18. An insert as set forth in claim 17, in which said internally threaded opening in said insert is adapted to engage said threaded shaft to provide longitudinal movement of said insert within said channel member upon rotation of said shaft.

* * * * *